United States Patent [19]
Kivelä

[11] Patent Number: 6,005,525
[45] Date of Patent: Dec. 21, 1999

[54] ANTENNA ARRANGEMENT FOR SMALL-SIZED RADIO COMMUNICATION DEVICES

[75] Inventor: Seppo Kivelä, Salo, Finland

[73] Assignee: Nokia Mobile Phones Limited, Espoo, Finland

[21] Appl. No.: 09/057,820

[22] Filed: Apr. 9, 1998

[30] Foreign Application Priority Data

Apr. 11, 1997 [FI] Finland ..................... 971522

[51] Int. Cl.⁶ ................................. H01Q 1/24
[52] U.S. Cl. ..................... 343/702; 343/718; 455/348
[58] Field of Search ............... 343/70, 702, 718, 343/720, 829; 455/344, 347, 348, 349; H01Q 1/24, 1/36

[56] References Cited

U.S. PATENT DOCUMENTS

| | | | |
|---|---|---|---|
| 4,998,078 | 3/1991 | Hulkko | 333/109 |
| 5,134,724 | 7/1992 | Gehring et al. | 455/274 |
| 5,189,431 | 2/1993 | Marinelli | 343/718 |
| 5,276,920 | 1/1994 | Kuisma | 455/101 |
| 5,341,149 | 8/1994 | Valimaa et al. | 343/895 |
| 5,394,160 | 2/1995 | Iwasaki et al. | 343/702 |
| 5,451,965 | 9/1995 | Matsumoto | 343/702 |
| 5,513,383 | 4/1996 | Tsao | 455/89 |
| 5,561,439 | 10/1996 | Moilanen | 343/846 |
| 5,564,082 | 10/1996 | Blonder et al. | 455/90 |
| 5,627,550 | 5/1997 | Sanad | 343/700 MS |
| 5,657,028 | 8/1997 | Sanad | 343/700 MS |
| 5,680,144 | 10/1997 | Sanad | 343/700 MS |
| 5,699,319 | 12/1997 | Shrivervik | 343/718 |
| 5,742,256 | 4/1998 | Wadabayashi | 343/718 |

FOREIGN PATENT DOCUMENTS

| | | |
|---|---|---|
| 0 588 271 A1 | 3/1994 | European Pat. Off. . |
| 0 588 365 A1 | 3/1994 | European Pat. Off. . |
| WO 94/24722 | 10/1994 | WIPO . |

OTHER PUBLICATIONS

"Microstrip Antennas", I.J. Bahl et al., Artech House Inc. Delman, MD. 1980.

"Analysis a Probe–Fed Short–Circuited MicroStrip Antenna", IEEE Transactions On Vehicular Technology, vol. 45, No. 3, Aug. 1996.

European Search Report.

*Primary Examiner*—David H. Vu
*Assistant Examiner*—Tho Phan
*Attorney, Agent, or Firm*—Perman & Green, LLP

[57] ABSTRACT

The scope of the present invention is the antenna arrangement of a radio communication device (87) intended for establishing a two-way connection, with which arrangement it is striven for to reduce the effects of the body on the properties of an antenna and on the other hand to reduce the radiation of the antenna towards the body. The antenna element (81) is planar and it consists of a ground plane and of a radiator (86) essentially parallel to it. The antenna element has been arranged in a position in which the ground plane ends up between the body of the user of the radio communication device and the radiator, and the amplification maximum of the radiation pattern of the antenna is directed away from the user of the radio communication device in an operating position typical of the radio communication device.

11 Claims, 9 Drawing Sheets

40

ANTENNA ARRANGEMENT FOR SMALL-SIZED RADIO COMMUNICATION DEVICES

FIELD OF THE INVENTION

The present invention relates to the antenna arrangement of a radio communication device intended for establishing a two-way connection, such as a radio telephone. With the antenna arrangement it is striven for to reduce the radiation of the antenna towards a user's body and on the other hand to reduce the effects of a body on the properties of an antenna.

BACKGROUND OF THE INVENTION

In prior known antenna constructions intended for personal radio communication devices it has been striven for a radiation pattern as symmetric as possible in order to that the position of the telecommunication device would not have an effect on the quality of a radio connection. The symmetry of the radiation pattern is however only realized in a free space. Various obstacles in the vicinity of a radio communication device have an effect on the radiation pattern of an antenna. Personal radio communication devices are at present so small that for example in radio telephones in which the microphone is integrated in the radio telephone, the antenna is, when in the operating position of the telephone, so close to the body that the body has an effect on the radiation pattern of the antenna. Radiation pattern is not symmetric in the typical operating positions of a radio telephone if the radio telephone is small-size and the antenna comes very close to the head and hand of the user of the telecommunication device.

It has been striven for to reduce the effect of the body on the radiation pattern and on the other hand to reduce the radiation towards the body using solutions, in which the radiation is attenuated or the form of the radiation pattern is changed using different shields placed between the antenna and the body. Also such solutions are prior known, in which it is striven for to move the radiating antenna element as far as possible from the user of the telephone. These solutions however are rather difficult to realize if a radio telephone is of very small size.

It has to be noticed that international standardizing organizations are defining measuring methods and limits for the radiation of the transmitters of mobile telephones directed towards the body of the users of mobile telephones, and accordingly it has to be accounted for in antenna designing. The radiation is measured in operating positions typical of a telephone using so called SAR—measuring (Specific Absorbtion Rate). The subject has to be paid attention to especially in the handphones of a cellular network, which operate at a rather high transmitting output power compared with the size of the telephone, such as AMPS, GSM, DCS and in the future UMTS. The radius of a cell, i.e. the maximum distance from the telephone to the nearest base station, is in these systems normally several kilometers, even up to tens of kilometers, and the transmitter output power of the handphone is up to 2 W.

The size of personal mobile stations is being continuously reduced, due to which the using of prior known antenna solutions is becoming more difficult. The problems of prior known solutions become evident with a particular emphasis, if a radio telephone is fastened rigidly to the body, e.g. with a strap on a user's wrist. In such a case both the effect of the hand on the antenna, and in the operating position the effect of the head on the antenna should be minimized.

In prior known technique it has been presented antenna solutions for pagers intended for fastening on the hand. A pager, however, does not comprise a transmitter, but only a receiver, and accordingly the radiation of the antenna towards the body does not cause a problem with pagers. Additionally, the operating position of a pager is different. In the operating position a pager is not brought close to the head, as is the case with a wristband telephone. In some antennas of wristband pagers it has though been striven for to reduce the effect of the hand on the antenna, but not that of the head. In addition to above in pagers it has been striven for an antenna direction pattern with as good a coverage to every direction as possible.

Also the requirements of a mobile telephone network on an antenna used in a telephone have to taken into account. A connection between a mobile telephone and a base station is a two-way connection, and thus the base station of the mobile telephone network has to be capable of receiving the signal transmitted by the mobile telephone. When a mobile telephone is placed in a wristband, or it is for some other reason desired to make a mobile telephone as small as possible, a transmitter cannot be designed to be very powerful in order to secure a connection. Using a transmitter with a higher output power would result in the need of a bigger power supply (battery), in which case a telephone would become large and heavy, and very difficult to place on the wrist. Thus the requirements on the antenna of a radio telephone are much stricter than on the antennas of such devices which only comprise a receiver. In radio broadcast receiver and pager systems transmitters are fixed, and accordingly they can be large, and in addition to it the power supplies are connected to mains voltage and thus the transmitters can be overdimensioned and correspondingly compromises can be made on the quality of the reception antennas.

SUMMARY OF THE INVENTION

The object of the present invention is to avoid the disadvantages of prior known technique and to realize an antenna arrangement for two-way radio communication devices, which arrangement is suited for use in personal mobile stations. The direction pattern of the antenna has been arranged to be such that the effect of the body on the direction pattern and on the other hand the radiation directed on the body by the antenna are as small as possible. The direction pattern of the antenna has been directed to the direction opposite to the radiation direction of the loudspeaker and the antenna is, or can be arranged to be, in such a position in which it is essentially in the body of the device outside the loudspeaker. The asymmetric direction pattern of the antenna is a disadvantage in many applications, but in this invention this feature is utilized.

The invention is characterized in enclosed independent claim 1 and its preferable embodiments in the unindependent claims.

Due to the invention the body has no essential effect on the radiation pattern of the antenna, nor is the radiation of the antenna directed at the body in the typical operating positions of the mobile station. It is possible to realize an antenna element according to the invention as a thin, planar construction, which makes it well suited for personal mobile stations of very small size. It is particularly well suited e.g. for a mobile station intended to mounted on the wrist and intended to be used in such a way that the telephone is not removed from the wrist for a call. With the ground plane, which is a part of the antenna construction, the radiation directed at the hand can be attenuated and on the other hand the effect of the hand on the form of the radiation pattern is reduced. The antenna arrangements according to the invention again provide a solution to the directing of the radiation pattern away from the user's head in the position in which a telephone is used during a call.

In some embodiments of the invention such antenna solutions are presented, in which the invention can be utilized in connection with conventional handheld telephones.

In one embodiment of the invention it is further presented an antenna solution for a mobile station which can be folded to a smaller size.

BRIEF DESCRIPTION OF THE DRAWINGS

The invention and its other features and advantages are explained in more detail in form of examples and with reference to enclosed figures, of which

DETAILED DESCRIPTION

In the following explanation call mode means a situation in which a call, i.e. a two-way radio connection has been established between a mobile station and a base station. In this case in the telephone both the transmitter and the receiver are in operation. In the explanation stand-by mode means such an operating state of the telephone in which it is ready to receive a call, in which case the receiver is in operation, the transmitter is not in operation.

In the following explanation a wristband telephone means a radio communication device intended for establishing a two-way radio connection, which device is intended for fastening on a user's wrist and intended to be used while fastened on the wrist both in the stand-by mode and in the call mode. A handheld telephone means in the explanation a radio communication device intended for establishing a two-way connection, which device is as to its size and form suited for being held in the hand.

Figure 1:
FIG. 1 presents a handphone according to prior known technique in its typical operating position.

FIG. 1 presents handheld telephone 10 according to prior known technique in a typical operating position. In this kind of handheld telephones of sufficient size it is possible to place antenna 11 in the top section of the telephone in such a way that the antenna can be brought into free space, with, as far as the function of the antenna is concerned, sufficient distance to both the user's hand and the user's head. In this type of telephones it is normally possible also to realize such an antenna construction, in which the antenna can be pushed inside the telephone. This protects the antenna from damage when the telephone is in the stand-by mode and it is kept e.g. in a pocket or on a belt.

Figure 2:
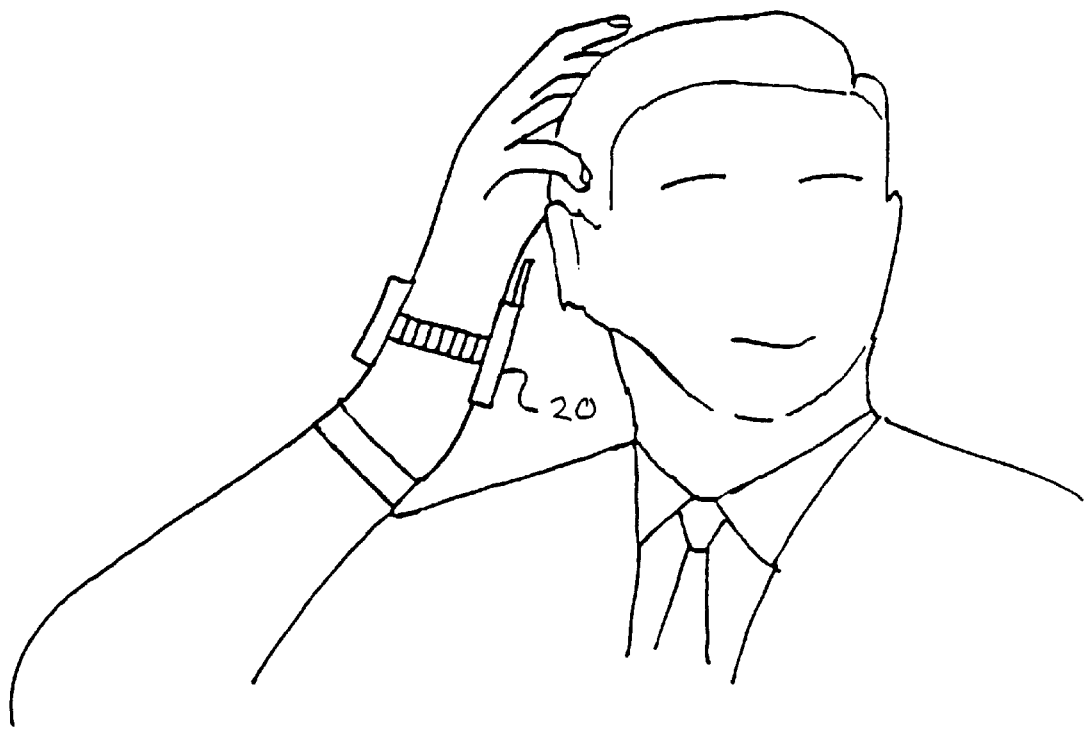
FIG. 2 presents the operating position during a call of a mobile station intended to be strapped on the wrist.

FIG. 2 presents the typical operating position of radio telephone 20 intended to be fastened on the wrist. The antenna solutions for handheld telephones according to prior known technique are not suited for this kind of a telephone.

The length of a rod antenna according to FIG. 1 has to have a certain ratio to the wavelength of the reception- and transmission frequencies used in the telephone. This results in a well operating rod antenna being of such a length that it is very inconvenient to use in a wristband telephone. The length of a rod antenna in a handheld telephone operating at the 900 MHz frequency range is typically approximately 10 cm. A telephone used in a wristband is so small that a rod antenna cannot be pushed inside the body of the telephone in the stand-by mode. Another antenna widely used in handheld telephones is a cylindrical helixantenna, which is shorter, but the diameter of which is rather big, and thus placing it in a small-size telephone is difficult, too.

Rod antennas and helix-antennas used in handheld telephones are omnidirectional, and in them it has been striven for a symmetric radiation pattern, and accordingly, when such antennas are used in a wristband telephone a sufficient distance from the antenna to both a user's head and hand should be arranged, at least in a call situation.

Antennas intended for wristband devices are used e.g. in pagers. Pagers only have a receiver, not a transmitter. Wristband telephones have also a transmitter and the telephones are subject to standards on limiting the effect on a user's body (SAR) of the magnetic field emitted by the antenna in the transmitting mode. The effects of the electromagnetic field are measured in operating positions typical of the telephone. In wristband pagers it has been striven for such antenna constructions in which the antenna would receive a signal as well as possible from all directions. Further, the operating position of a pager is different from that of a wristband telephone, and thus pager antennas are not suited for use in wristband telephones.

Figure 3A:
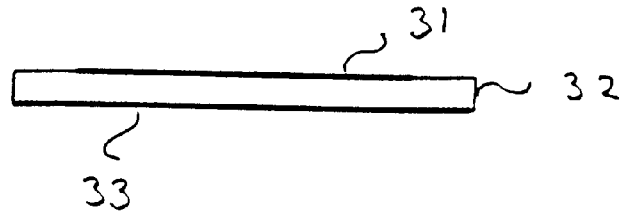
FIGS. 3a, 3b and 3c present a microstrip antenna according to prior known technique viewed from different directions.
Figure 3B:
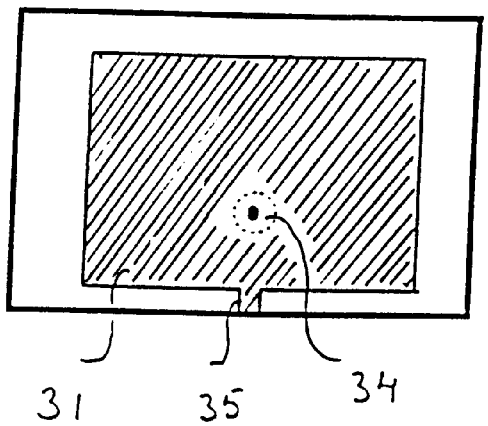
Figure 3C:
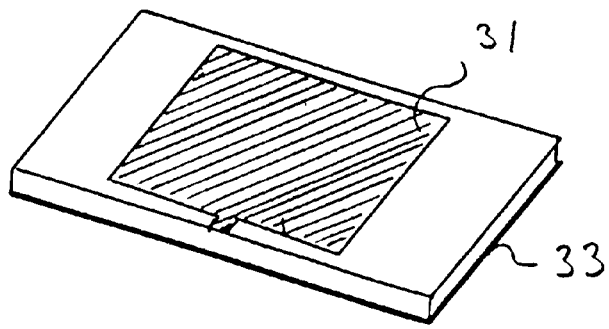

FIGS. 3a, 3b and 3c present microstrip patch antenna 30. It consists of conductive patch 31, which has been formed on sheet-like substrate 32 having certain electric properties (permittivity). Conductive foil 31 acts as the radiator part of the antenna and on the opposite side of the sheet there is unruptured ground plane 33 (formed e.g. using a conductive foil). Radiator feeding 34 takes place e.g. coaxially through the ground plane or using transfer line 35 from the edge of the sheet.

A square radiator is in resonance when the length of its edge approximately corresponds with a half wavelength on the substrate material used. By using a substrate material having high permittivity, the size of the radiator and thus also the size of the whole antenna can be reduced. This however results in the reduction of the efficiency of the antenna, and accordingly the antenna dimensions cannot be made very small. The radiation pattern and bandwidth of an antenna are strongly effected by the form of the radiator. The dimensioning of a microstrip patch antenna has been explained in more detail among other things in publication: "Microstrip antennas", I. J. Bahl and P. Bhartia published in 1980 by Artech House Inc. of Delman, Md., U.S.A. When the microstrip antenna is used in this invention, such a radiation pattern is formed, which is asymmetric as to radiator 31, 62, 72 in such a way that amplification maximum 74 of radiation pattern 61, 71 is directed in the antenna element to the radiator side and the radiation to the side of ground plane 33, 63, 73 is small. The form of the radiation pattern has been presented roughly in FIGS. 6 and 7.

Figure 4A:
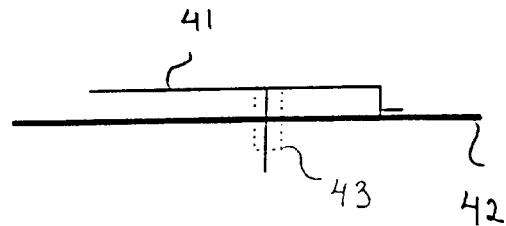
FIGS. 4a, 4b and 4c present a PIFA antenna according to prior known technique viewed from different directions.
Figure 4B:
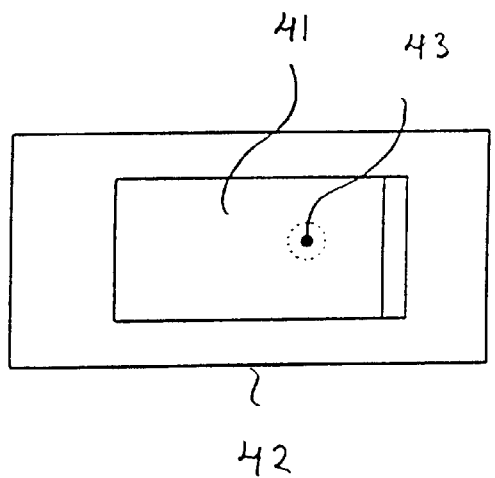
Figure 4C:
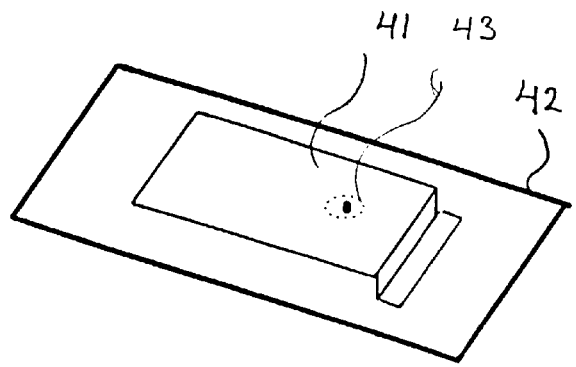
Figure 6:
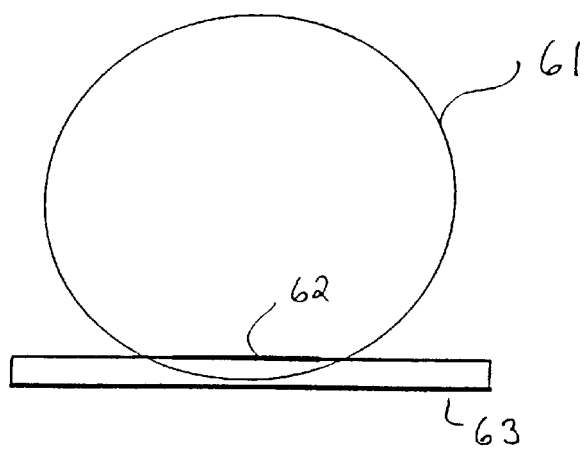
FIG. 6 presents the radiation pattern of a planar antenna when a large ground plane is used.
Figure 7:
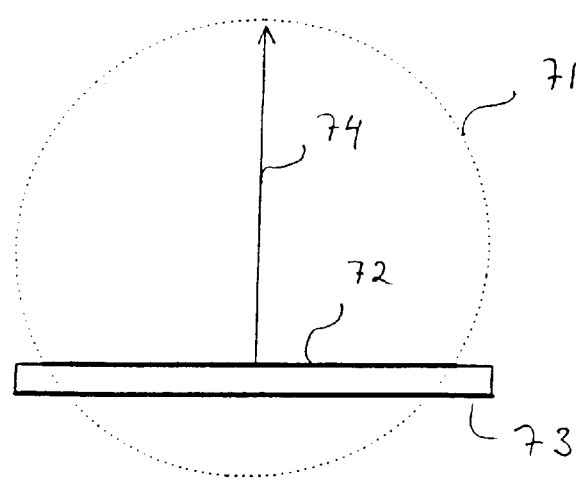
FIG. 7 presents the radiation pattern of a planar antenna, when such a ground plane is used, the size of which is close to that of the radiator.

FIG. 4 presents another planar antenna solution 40 PIFA (Planar Inverted F-Antenna). In it metal sheet 41 acts as a radiator, which sheet has at one end been fixed to ground plane 42. The feeding can be made e.g. coaxially 43 to the radiator. It is possible to have an effect on the electric properties of the antenna construction in question e.g. with the form of the radiator, the location of the feeding point in the radiator and with the distance of the radiator from the ground plane. The dimensioning of a PIFA-antennas has been explained in more detail among other things in publication: "Analysis of a Probe-Fed Short Circuited Micro Strip Antenna", IEEE Transactions on vehicular technology, Vol 45 No. 3, August 1996. The PIFA-antenna is used in this invention also in such a way that the radiation pattern formed by it is asymmetric in such a way that the amplification maximum is in the antenna directed to the side of radiator 41 and the radiation to the side of ground plane 42 is small. The forms of radiation patterns presented in FIGS. 6 and 7 are thus valid also for an antenna of PIFA-type.

It is possible to make several modifications of above antenna constructions, with which it is striven for to make the antenna suited for mass production and mechanically solid. For example it is possible to use in a PIFA-antenna solid material in the space between the radiator and the ground plane, the permittivity of which material approximately corresponds with the permittivity of air, in which case a more solid antenna construction is obtained. The feed to the radiator can likewise be arranged in several ways, for example in such a way that the antenna is made as a surface mounted component (SMD, Surface Mounted Device), in which the antenna feed point is connected from the radiator to a soldering pin on the edge of the ground plane. An antenna element can also comprise several radiators on the same side of the ground plane which radiators are parallel to the ground plane. The form of the radiator is not limited to a planar construction, but the radiator can be e.g. a wire bent parallel to the ground plane as in an antenna of IFA-type (Inverted F-Antenna).

Common features to all these antenna constructions which can be utilized in the invention are a large ground plane and a radiator or radiators essentially parallel to the ground plane, or that a planar antenna is intended to be fixed to a large ground plane, in which case a corresponding structure is formed, characteristic of which it is an asymmetric radiation pattern, the maximum of which is directed essentially away from the ground plane.

It can be mentioned about the area required by antennas that such planar antennas realized using present technique which are suited for the present radio telephone systems of cellular network require even at minimum an area of several cm$^2$.

FIG. 6 presents roughly direction pattern 61 of an antenna when it is used with ground plane 63, which is very large compared with the size of radiator 62. In small-size telephones the size of ground plane 63, 73 has to be limited in such a way that its size is close to the size of radiator 62, 72, in which case the antenna radiates somewhat also to the side of the ground plane. FIG. 7 presents roughly the form of direction pattern 71 when smaller ground plane 73 is used. Distance 74 of the perimeter of the circle from the radiator describes the relative strength of the electromagnetic field in the direction concerned when the antenna is connected to a transmitter. When such a planar antenna is placed in a wristband or in a telephone fixed in a wristband in such a position that the ground plane is between the wrist and the radiator, the maximum of the radiation pattern of the antenna can be directed away from the wrist. The minimum of the antenna radiation is directed towards the wrist and on the other hand the effect of the wrist on the radiation pattern of the antenna is reduced.

In a wristband telephone at least a part of the telephone, such as microphone 84 and loudspeaker 85 (FIG. 8b) are placed on the palm side of the hand, in order to make it possible to use the telephone without removing it from the wrist. In some solutions all functions of a telephone can be placed in the palm-side part of a wristband. Sometimes, on the other hand, it may be well founded to place all functions of the telephone on the back side of the hand.

If a telephone is entirely placed on the palm side of the hand, the antenna cannot however be placed on the same side, because in the operating position of a wristband telephone according to FIG. 2, when the ground plane of the antenna is towards the wrist, the maximum of the radiation pattern would directed straight towards the user's head. In addition to that, the antenna would end up in the space between the hand and the head fully in a dead spot.

Figure 8A:
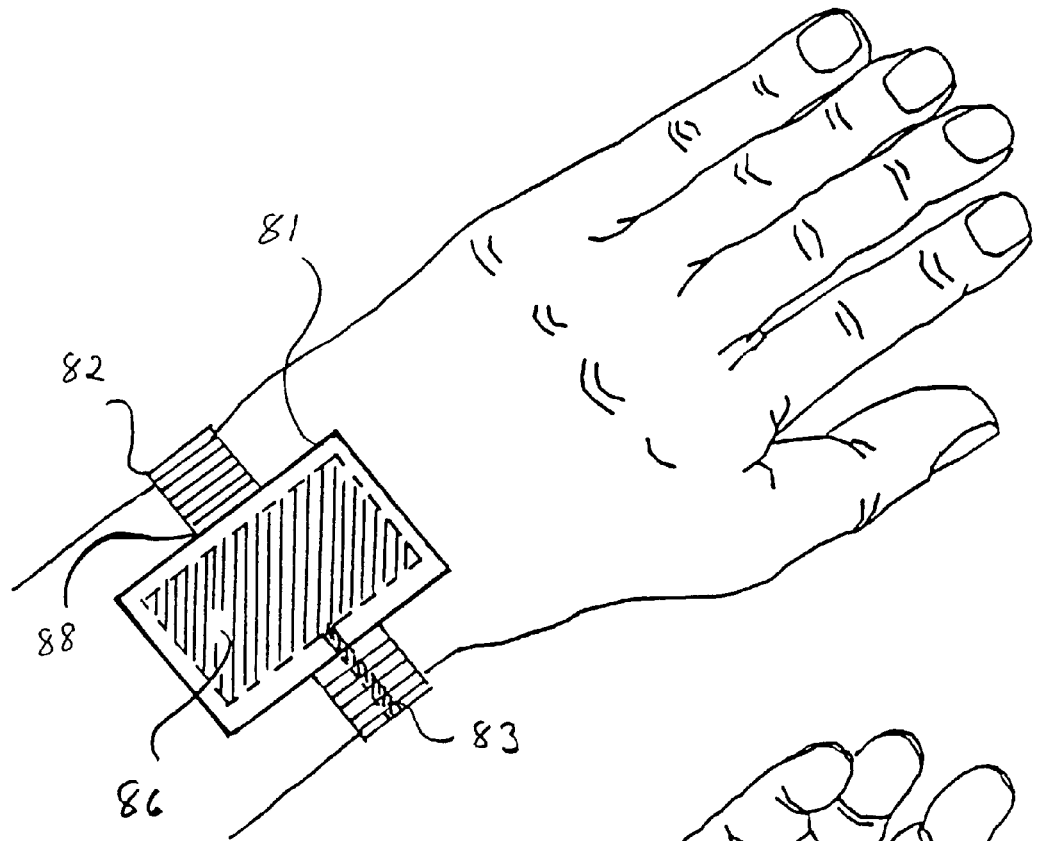
FIGS. 8a and 8b present one of the locations of an antenna element according to the invention.
Figure 8B:
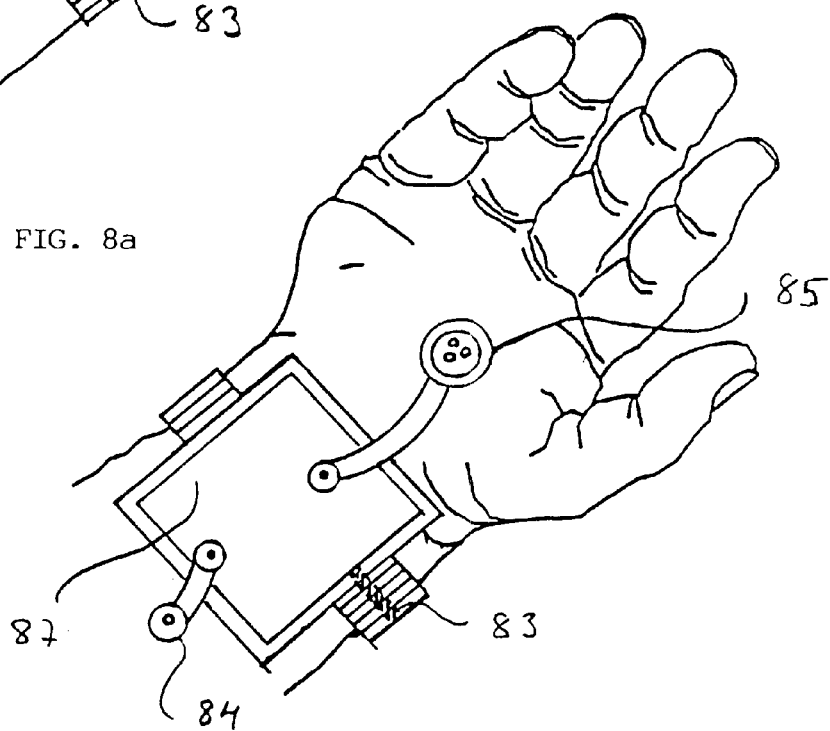

FIGS. 8a and 8b present an antenna location, by using which it is possible to avoid the antenna problem of this type of telephone. Planar antenna element 81 has been placed on the back side of the hand in such a way that the ground plane of the antenna is towards the hand and the ground plane is located between radiator 86 and the wrist. The antenna feed from radio section 87 to the antenna can be arranged inside wristband 82 e.g. using flexible coaxial cable 83. The advantage is that in this way quite a large area is achieved for the antenna and accordingly a good efficiency. A large antenna radiator is achieved, and thus the efficiency of the antenna is good and a ground plane which is large compared with the radiator is achieved, in which case the radiation towards the hand is small. In addition to that, the direction pattern of the antenna remains unchanged and the direction is not changed independent of the diameter of the wristband, which diameter can vary quite a lot depending on the user.

If a telephone is almost entirely placed on the back side of the hand, the quite large area required by the user interface (among other things keyboard and display) of the telephone together with an antenna becomes a problem. The present digital mobile stations have e.g. short message services (SMS), in which text messages are sent. In order that the writing and reading of text messages would be as easy as possible, display 91 (see FIG. 9) should be as large as possible and also keys 92 should be as large as possible. As it was mentioned above, the surface area of antenna element 93 should be as large as possible in order to achieve a correct direction pattern and a good efficiency. The antenna should be placed in such a way that radiator side 94 of the antenna is not covered with components or a material which attenuates a signal transmitted or received by the antenna, or which material essentially changes the direction pattern of the antenna. A radiator element can be coated with a suitable protective material, e.g. with thin, low-loss plastics, but the placing of a display or a keyboard on top of the antenna would cause many kinds of problems.

An antenna can neither be placed on the palm side of the hand, where there would be room now, because the components of the telephone, except for the microphone and the earphone, are on the back of the hand. An antenna on the palm side of the hand would be in a dead spot between the hand and the head and the maximum of the direction pattern would be directed towards the head in the operating position of the telephone.

The placing of an antenna with sufficient surface area on the side of a wristband section would cause problems, because the antenna should not be essentially wider than the wristband and the antenna should be adaptable to wrists of different sizes in order to be pleasant to the user. Further, the requirement on the form of the radiation pattern has to be taken into account. The radiation pattern should not in typical operating positions be directed towards the user's head. If the antenna should be placed for example on the thumb side of the wristband, it would be very easy to accidentally use the telephone momentarily in such a way that the antenna radiation would be directed directly towards the user's eye, even in such a way that the antenna would have direct contact with the eye.

Figure 9:
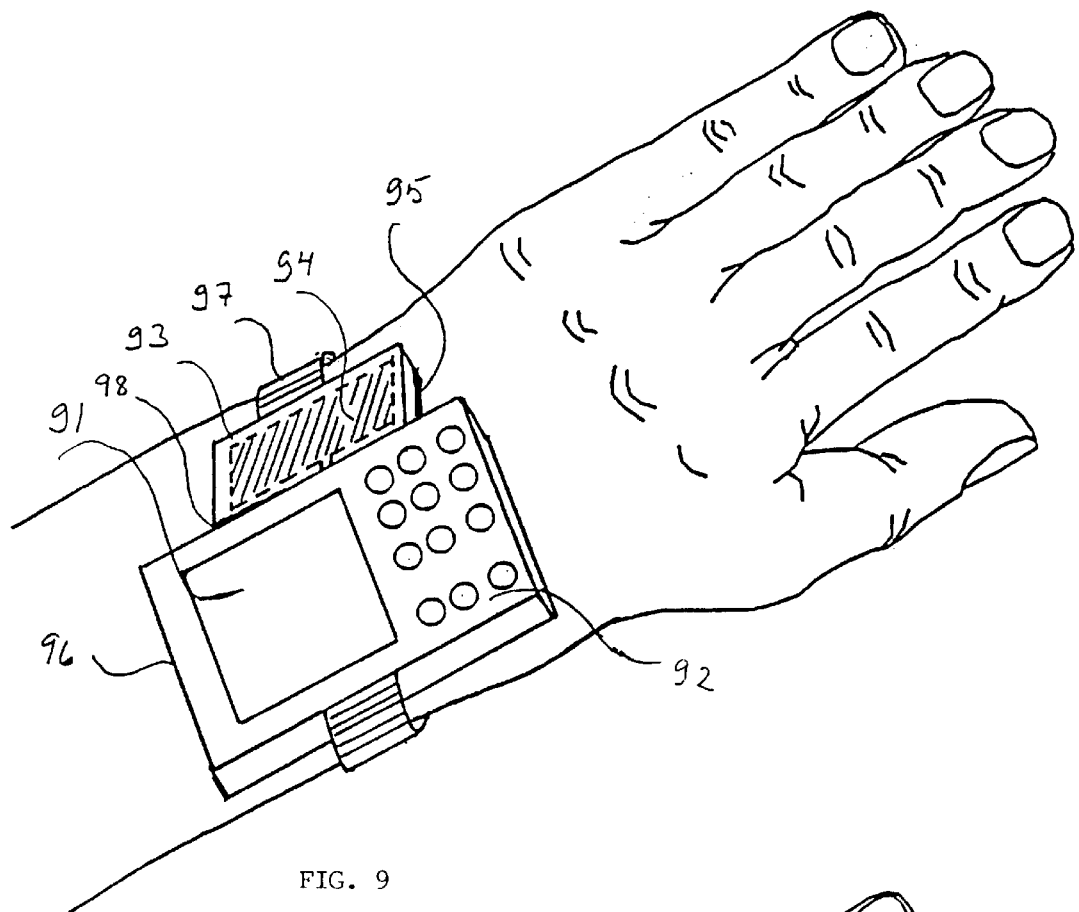
FIG. 9 presents one of the locations of an antenna element according to the invention.

FIG. 9 presents a solution which makes it possible to use an antenna with sufficient surface area in a wristband telephone. In it antenna ground plane 95 is towards the user's hand, and thus the direction pattern of radiator 94 is directed away from the hand. The antenna has been placed on the back side of the hand in such a way that its direction pattern is directed to the sector between the back and little finger side of the hand. In this way it is very difficult to use the telephone by mistake in such a way that the direction pattern maximum would be directed towards the user's head. The antenna can be hinged 98 to both telephone housing 96 and wristband 97, and thus it adapts itself to wrists of different sizes. The antenna and the connection of the antenna to the telephone can be made symmetric in such a way that the antenna can be connected to the telephone for either a left-handed or a right-handed user of the telephone. The ground plane of the antenna and the earthing of the telephone can be connected to each other over a joint. The feed of the antenna can be made e.g. using a separate, flexible coaxial connection or over a hinged joint (not shown in the figure). If telephone housing 96 can be made sufficiently small, the antenna element can also be divided into several parts or be designed in such a way that keypad 92 and display 91 are encircled by it.

Because it is inconvenient to use a telephone with large area on a wristband, there is one solution to make the telephone in several parts in such a way that the parts are folded on top of each other when the telephone is in the stand-by mode. The telephone is opened only in a call situation in such a way that all parts of the user interface are visible and accessible.

Figure 10:
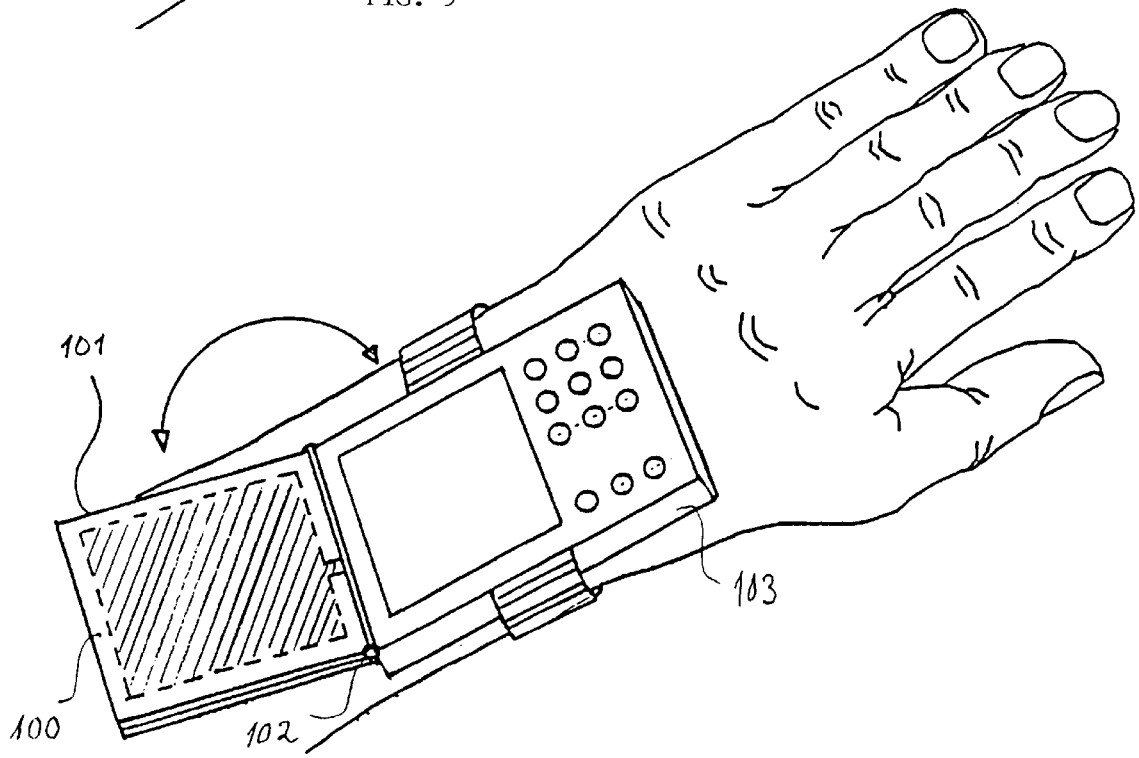
FIG. 10 presents one of the locations of an antenna element according to the invention.

FIG. 10 presents a solution in which antenna 100 has been placed on protective cover 101, which in the stand-by mode can be folded to protect the keypad and/or display. Using this solution it is possible to realize an antenna with quite a large area and thus also a high efficiency. Because the protective cover swings ca. 150 to 180 degrees when opened, also the direction pattern of the antenna is respectively turned towards the of the user of the telephone. This problem can be solved by making in the protective cover a symmetric antenna construction according to FIG. 5, which construction has ground plane 51 in the middle of the protective cover and radiators 52, 53 on both sides of the protective cover. Hinge 54 of the protective cover can equipped with a switch or the hinge can control a switch which recognizes the position of the protective cover. As the radiator it selected based upon the position of the protective cover the radiator, the radiation pattern of which is directed in the concerned position essentially away from the hand. A changeover of the radiators can take place for example in the position in which the protective cover is at approximately a 90 degree angle to the telephone.

It is also possible to use in a wristband telephone an antenna in such a way that both radiators are utilized when the protective cover has been opened in an approximately 90 degree angle. The antenna can be used either in such a way that both radiators are connected in parallel when the protective cover is opened or the receiver can for example at certain intervals connect alternatingly both radiators in use and compare which one gives better signal quality or strength. Radio telephones have measuring circuits with which the strength and quality of a received signal is monitored. The selecting of the radiator is made based on these measuring results. A radiator selecting circuit is described by FIG. 14 and the corresponding explanation. Even in this position of the protective cover the maximum of the direction pattern of the antenna is directed away from the head. The distance of the antenna to the hand is increased, and the maximum of the direction pattern of the antenna is not directed toward the hand.

If one radiator is used in the stand-by mode and two radiators in the call-mode, it has to taken into account that the impedance of the antenna is different in the stand-by mode and in the call mode. In such a case a telephone has to be equipped with two antenna feed circuits or the impedance of the antenna feed circuit has to be made variable in such a way that the impedance of the antenna feed circuit always is essentially the same than the impedance of the antenna in use. The impedances of the antennas can be dimensioned utilizing the above mentioned publications concerning planar antenna constructions and the publications mentioned in them. The dimensioning of adapter circuits is prior known to a person skilled in the art, the subject being handled among other things in publication "Antenna Impedance Matching", Wilfred N. Caron published in 1989 by American Radio League, Newington, U.S.A.

It is also possible to make the protective cover in a wristband telephone to be sliding and equip it with a planar antenna, in which case there is no need for two radiators. In the stand-by mode of the telephone the protective cover is slided to cover the keypad and/or display and for a call it is opened. The ground plane is placed on the bottom surface of the protective cover and a radiator on the top surface. The earthing of the antenna and the connecting of the radiator to the antenna is done for example using slide contacts or flexible cables.

The invention can also be applied to handphones which are not intended to be fastened to a user's wrist. In the call mode the handphone is taken close to the user's head in such a position that loudspeaker 116 of the telephone comes close to the user's ear and voice 114 reproduced by the loudspeaker is directed towards the ear. Correspondingly, in the operating position it is striven for to bring microphone 117 as close to the user's mouth as possible in order to direct speech 115 to microphone 117 as well as possible. A handphone is brought to such an operating position by gripping the body of the telephone, typically in part 118, 138 below loudspeaker 116. For the directing of voice and the transforming of frequency response it is used covers 113, 119, 134, 136 covering the loudspeaker and the microphone, which covers have been provided with apertures of suitable size and form.

The user's hand shades the antenna if a planar antenna is placed in the body of a handphone in such a way that it is in section 118 of the body between loudspeaker 116 and microphone 117 or at least for essential part in said area or the antenna is in protective cover 110 of the keypad, which cover in a call situation is opened downwards in front of the user's mouth. Respectively, in FIG. 13 the placing of the antenna for essential parts in area 138 of the body, which the user grips with his/her hand would cause a shading problem. All above antenna arrangements have the disadvantage that in a typical operating position the antenna the antenna remains in the space between the user's head and hand. In such cases the properties of the antenna may change significantly because of the effects of the hand and the head. The object of the placing of an antenna element according to the invention is to avoid the above mentioned disadvantages by placing the antenna for essential parts outside the area which the user typically grips with his/her hand.

Figure 5:
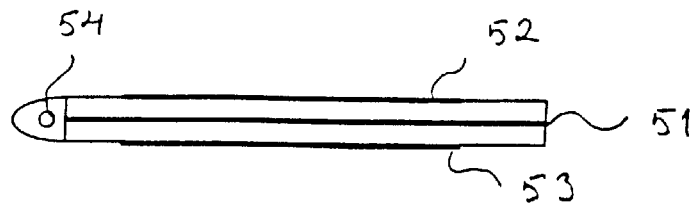
FIG. 5 presents a symmetric planar antenna according to the invention with two radiators.
Figure 11:
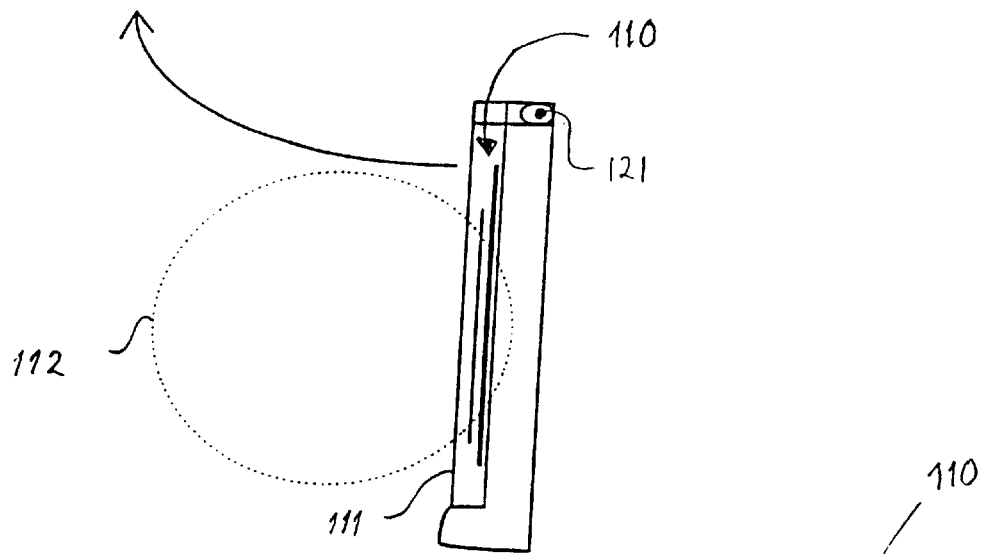
FIG. 11 presents a handheld radio communication device and applied in it, an antenna location according to the invention when the radio communication device in stand-by mode.
Figure 12:
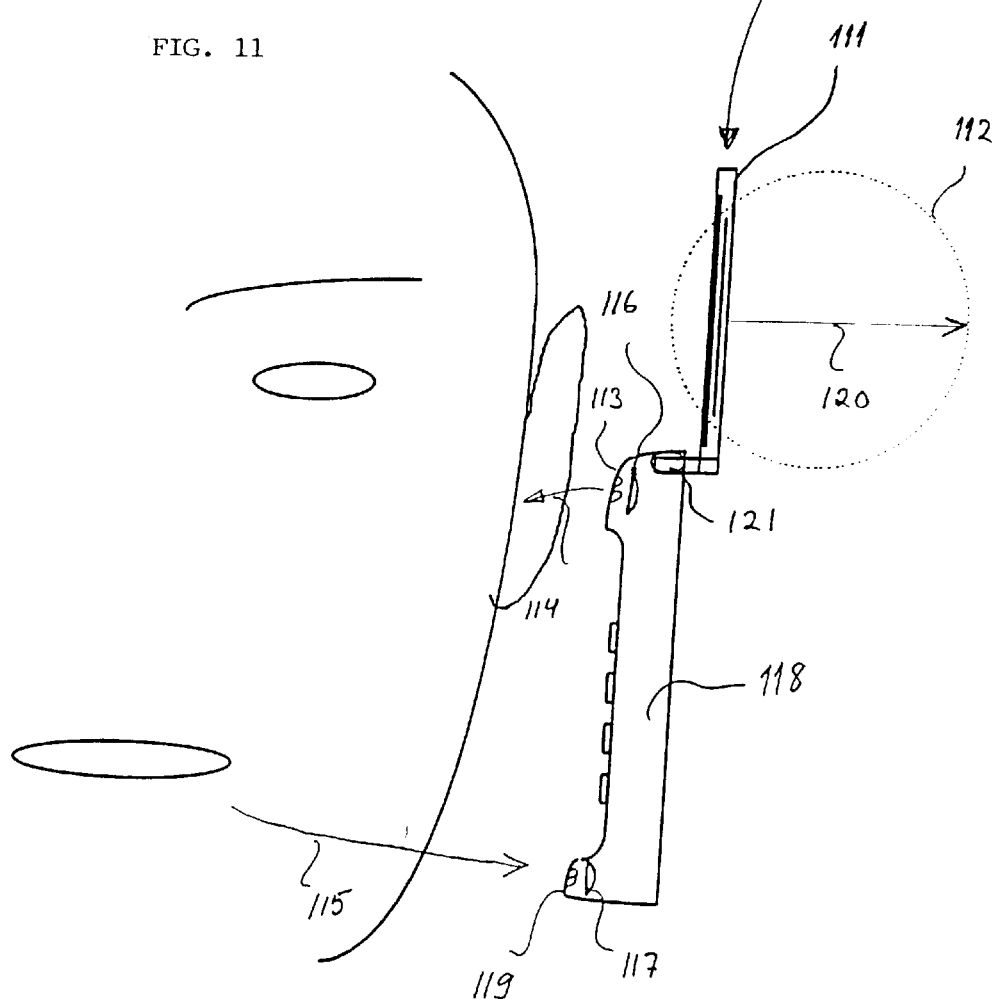
FIG. 12 presents the radio communication device according to FIG. 11 when the radio communication device in call-mode.

The present invention can also be applied to a conventional handphone in the way presented in FIGS. 11 and 12. The antenna placed in protective cover 111 is in the call-position turned upwards, away from the shade between the hand and the head, and because of this the effects of the hand and the head on the antenna are minimized and in addition to it, direction pattern 112 of the antenna is directed away 120 from the head. If the protective cover is, as in FIG. 11, on the same side as the loudspeaker of the telephone, a two-radiator construction presented in FIG. 5 is not needed, because in the stand-by mode the direction pattern is directed away from the telephone and in the call-position away from the head.

Figure 13:
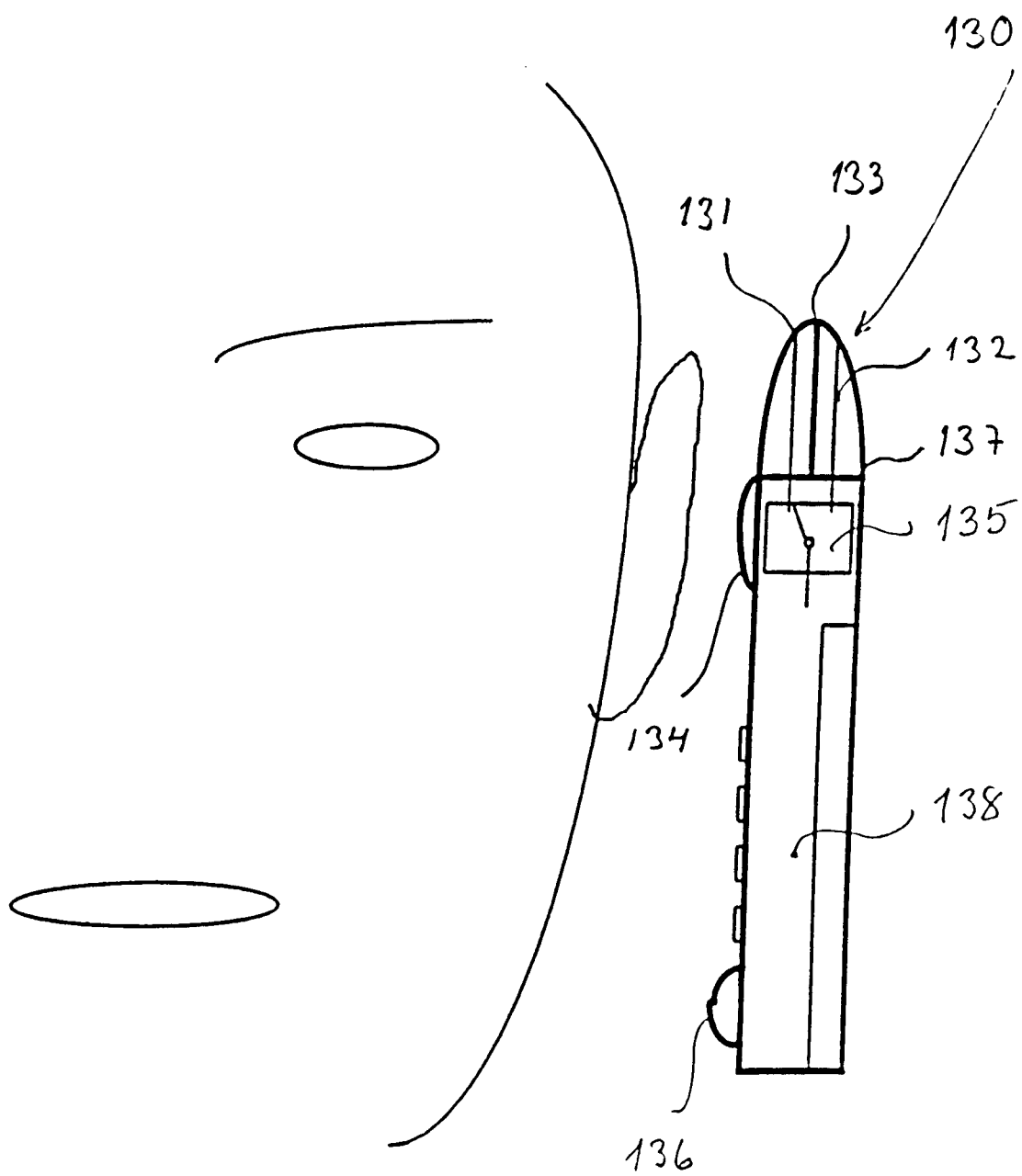
FIG. 13 presents one of the locations of an antenna element according to the invention.

It is also possible to apply the present invention by using two-radiator 131, 132, symmetric, fixed antenna construction 130 according to FIG. 13. Between the radiators there is ground plane 133. The selecting of a radiator can be performed for example as follows. In a call situation it is selected for use the radiator (132) which is on the opposite side to loudspeaker 134, in which case the radiation pattern is always in a call situation directed away from the head. Controller section 148 of the telephone always knows when an incoming call has been answered or an outgoing call is initiated i.e. when the transmitter is on. This same information can be used for the selecting of an antenna in the call mode.

Radiator 131 can be connected to operation in the stand-by mode. If a telephone is set for example on a conductive surface in a position in which radiator 132 ends up between the ground plane of the antenna and the conductive surface, the function of the antenna may be disturbed. In the stand-by mode the transmitter is not in operation, and thus there is no radiation directed at the body and the selecting of the antenna radiator can be made merely based upon which radiator that is working better.

Figure 14:
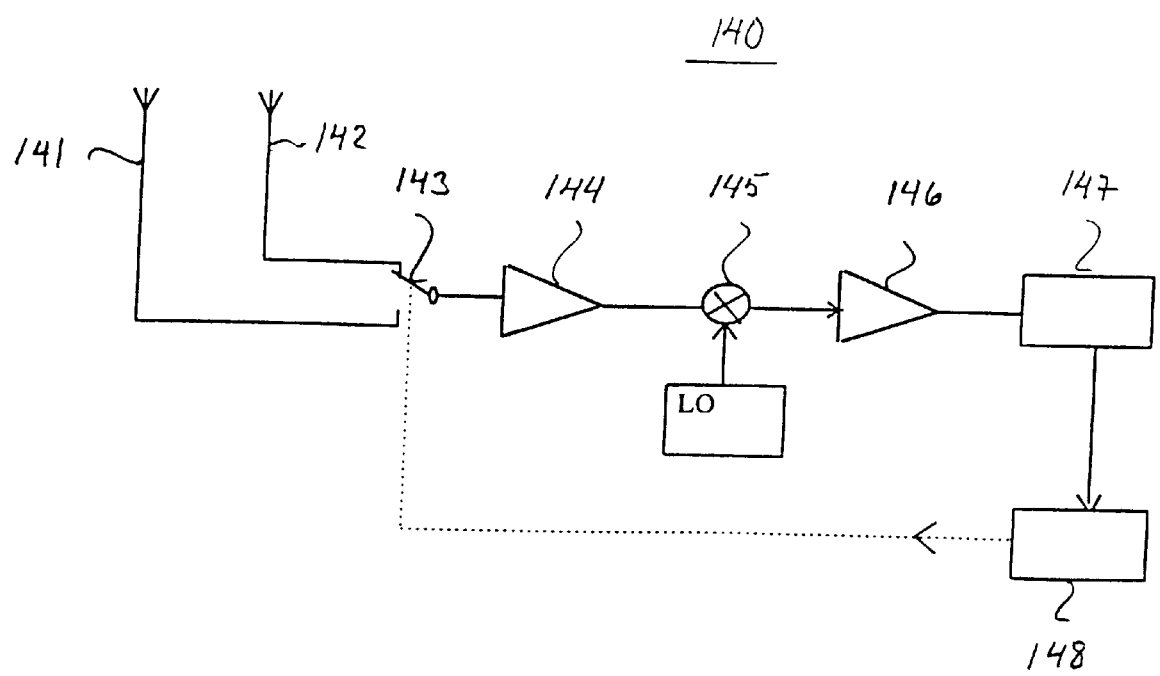
FIG. 14 presents in form of a block diagram a radiator selecting circuit according to the invention, when an antenna element comprises two radiators.

FIG. 14 presents in form of a block diagram radiator selecting circuit 140, when there are two radiators 141, 142 in the antenna element and the selecting of the antenna is carried out based upon the strength or the quality of a received signal. The received high frequency signal is amplified in amplifier 144 and mixed in mixer 145 into an intermediate frequency- or baseband signal and is further amplified in amplifier 146. Mobile telephones have a measuring circuit which monitors the strength of a received signal, a so called RSSI-circuit (Received signal Strength Indicator) and the quality of the signal (BER, Bit Error Rate). The signal is conducted further to circuit 147 in which said measuring of signal strength and quality are made. The measuring result s are conducted to controller section 148 which interprets the measuring results and when the strength and/or quality of the signal becomes poor, directs antenna selecting switch 143 to the other position. The signal measuring is remade in this position of the switch. After the measuring the antenna selecting switch is left in the position which produces the better signal.

The measuring can be repeated at certain intervals in such a way that the telephone carries out a comparison at the same time when it performs a RSSI—measuring e.g. based upon orders given by the telephone network. The comparing can also be made only when needed, i.e. in the stage when it is noticed that the strength of the received signal has been reduced, the radiator is changed and it is tried whether the other radiator produces a stronger signal, if it does, it will be connected as the antenna.

The primary application objects of the invention are thought to be small-size radio telephones of a cellular network, but the application possibilities of the invention naturally are not limited to only these primary application objects, the invention can be used also in other radio communication devices with a different construction, in which devices the use of an omnidirectional antenna causes problems, it is desired to obtain a certain antenna directional pattern or it is desired to minimize the effect of the user's body on the properties of the antenna.

As examples it can be mentioned low-power cordless telephones and personal radio communication devices divided into several parts. With a radio communication devices divided into several parts it is meant for example a construction in which the user interface of the telecommunication device is a separate unit which communicates with the radio section of the telecommunication device using a low-power radio link.

I claim:

1. A radio communication device intended for establishing a two-way connection comprising:

first transform means for transforming a received electric signal into a first acoustic signal, means for transmitting the first acoustic signal in a certain direction, means for receiving a second acoustic signal from a certain direction, second transform means for transforming the second acoustic signal into an electric signal, at least one planar antenna element having a certain radiation pattern, said radiation pattern having an amplification maximum of said radiation in a certain direction, said antenna element comprising a planar ground plane having at least, a first radiator on one side of said ground plane and a second radiator on the opposite side of said ground plane, said first and second radiators being arranged essentially parallel to said ground plane, said radio communication device further comprising selection means for performing a selection between said first radiator and said second radiator in order to use one of said radiators at a time as the radiator of the antenna element, and wherein the direction of said amplification maximum of said antenna element when said first radiator is selected is essentially in the direction of said first acoustic signal and wherein the direction of said amplification maximum of said antenna element when said second radiator is selected is in a direction essentially opposite to the direction of said first acoustic signal.

2. A radio communication device according to claim 1 further including: a body comprising an area said body comprising said first transform means and said second transform means at a distance from each other and means for arranging said antenna element into a position in which said antenna element is essentially outside said body area.

3. A radio communication device according to claim 1, wherein the radio communication device is handheld.

4. A radio communication device according to claim 1, wherein the radio communication device further comprises:

reception means for receiving and processing a signal received by said antenna element, measuring means for at least one of measuring the strength of the received signal and measuring signal quality of the received signal, and for outputting a measurement result, and means for controlling said selection means to select between said first and second radiator based on said measurement result.

5. A radio communication device according to claim 1, wherein said antenna element is movable between a first position and a second position and wherein said selecting means is responsive to the position of said antenna element.

6. A radio communication device intended for establishing a two-way connection comprising a wristband for fastening the radio communication device on a wrist of a hand of a user, said wrist having a palm side corresponding to a palm side of said hand and a back side corresponding to a back side of said hand, a loudspeaker for reproducing a first acoustic signal to said user, a microphone for receiving a second acoustic signal from the user, an antenna element for transmission and reception of radio signals, said wristband, said loudspeaker, said microphone and said antenna being arranged about said communication device such that when the communication device is fastened on the user's wrist, and the communication device is in operation, said loudspeaker and said microphone are located at the palm side of the user's wrist or hand and said antenna element is located on the back side of the user's wrist or hand.

7. A radio communication device according to claim 6, wherein said antenna element is a planar antenna element comprising a ground plane and at least one radiator essentially parallel to said ground plane.

8. A radio communication device according to claim 6, wherein said antenna element comprises a planar ground plane having at least, a first radiator on one side of the ground plane and a second radiator on the opposing side of the ground plane, said first radiator and said second radiator being essentially parallel to the ground plane.

9. A radio communication device according to claim 8, further comprising means for performing a selection between said first and second radiator in order to use one of said radiators at a time as the radiator of the antenna element.

10. A radio communication device according to claim 6, wherein said antenna element is arranged in a fixed position in which the amplification maximum of the radiation pattern of said element is directed to a direction essentially opposite to the direction of said first acoustic signal.

11. A radio communication device according to claim 6, comprising means for turning said antenna element into a position in which the amplification maximum of the radiation pattern of said antenna element is directed to a direction essentially opposite to the direction of said first acoustic signal.

* * * * *